United States Patent
Rhie et al.

(10) Patent No.: US 10,922,692 B2
(45) Date of Patent: Feb. 16, 2021

(54) METHOD FOR CALCULATING CONFIRMATION RELIABILITY FOR BLOCKCHAIN BASED TRANSACTION AND BLOCKCHAIN NETWORK MONITORING SYSTEM FOR PERFORMING THE METHOD

(71) Applicant: SAMSUNG SDS CO., LTD., Seoul (KR)

(72) Inventors: Ji Hwan Rhie, Seoul (KR); Hee Jung Wang, Seoul (KR); Kwang Wook Lee, Seoul (KR); Dong Hoe Kim, Seoul (KR); Seung Won Son, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 376 days.

(21) Appl. No.: 15/933,592

(22) Filed: Mar. 23, 2018

(65) Prior Publication Data
US 2018/0293583 A1    Oct. 11, 2018

(30) Foreign Application Priority Data

Apr. 5, 2017 (KR) .................. 10-2017-0044313
Aug. 29, 2017 (KR) .................. 10-2017-0109258

(51) Int. Cl.
*G06Q 20/40* (2012.01)
*G06Q 20/42* (2012.01)
*G06Q 20/02* (2012.01)

(52) U.S. Cl.
CPC ......... *G06Q 20/4016* (2013.01); *G06Q 20/02* (2013.01); *G06Q 20/42* (2013.01); *G06Q 2220/00* (2013.01)

(58) Field of Classification Search
CPC .... G06Q 20/4016; G06Q 20/02; G06Q 20/42; G06Q 2220/00
See application file for complete search history.

(56) References Cited

U.S. PATENT DOCUMENTS

2017/0236123 A1* 8/2017 Ali ................. G06Q 20/3825
                                                        705/75

FOREIGN PATENT DOCUMENTS

KR    101628009 B1    6/2016
KR    101784219 B1    10/2017

OTHER PUBLICATIONS

Nakamoto, Satoshi. "Bitcoin: A Peer-to-Peer Electronic Cash System" [Online] Bitcoin.org, Oct. 2008. [Retrieved on May 23, 2020]. Retrieved from the internet: URL: https://bitcoin.org/bitcoin.pdf (Year: 2008).*

(Continued)

*Primary Examiner* — Taghi T Arani
*Assistant Examiner* — Joshua Raymond White
(74) *Attorney, Agent, or Firm* — Sughrue Mion, PLLC

(57) ABSTRACT

Provided is a method comprising acquiring information on a branch formed on blockchain data, calculating a difference in a block height between a target block corresponding to a current block height of the blockchain data and a block in a non-branched state based on the information on the branch and calculating a transaction confirmation reliability of transaction data recorded in the target block based on the difference in the block height, wherein the transaction confirmation reliability indicates a probability that, for as k blocks are further connected after the target block, a position of the block at which the transaction data is recorded will not change, wherein k is an integer greater than zero.

14 Claims, 13 Drawing Sheets

(56) References Cited

OTHER PUBLICATIONS

Globel, J. et al. "Bitcoin Blockchain Dynamics: the Selfish-Mine Strategy in the Presence of Propagation Delay" [Online] May 2015. [Retrieved on May 24, 2020]. Retrieved from the internet: URL: https://arxiv.org/pdf/1505.05343.pdf (Year: 2015).*

* cited by examiner

Distributed ledger

METHOD FOR CALCULATING CONFIRMATION RELIABILITY FOR BLOCKCHAIN BASED TRANSACTION AND BLOCKCHAIN NETWORK MONITORING SYSTEM FOR PERFORMING THE METHOD

This application claims priority from Korean Patent Application No. 10-2017-0044313 filed on Apr. 5, 2017 and No. 10-2017-0109258 filed on Aug. 29, 2017 in the Korean Intellectual Property Office, the disclosure of both of which are hereby incorporated by reference in their entirety.

BACKGROUND

1. Field of the Disclosure

The present disclosure relates to a method for calculating confirmation reliability for blockchain-based transaction, and a blockchain network monitoring system for performing the method. More specifically, the present disclosure relates to a method for calculating the transaction confirmation reliability indicating a probability that a position of a block in which specific transaction data is recorded on the blockchain data does not change, and a blockchain network monitoring system which monitors a plurality of blockchain nodes which constitutes the blockchain network for executing the method.

2. Description of the Related Art

A blockchain refers to a data management technique in which persistently increasing data are recorded in blocks of a specific unit, and each node constituting a peer-to-peer (P2P) network manages the blocks in a chain-like data structure or data itself constituted by the data structure of the chain form. At this time, the blockchain data constituted by the data structure in the form of a chain is operated in the form of a distributed ledger at each node without a central system, as comparatively illustrated in FIGS. 1 and 2.

The blockchain technique may be applied to various fields for management of distributed data and prevention of data forgery. For example, in the case where the blockchain technique is applied to a financial field, even if there is no central financial institution that guarantees reliability, the transaction parties may make a safe transaction through the distributed ledger managed by each distributed blockchain node.

One of the reasons why safe transactions can be executed through the distributed ledger can be found in the data structure in the form of a chain constructed by a hash-based operation. Specifically, each blockchain node constituting the blockchain network manages the block with the data structure illustrated in FIG. 3, the hash value of the preceding block is recorded on each block, and the preceding block can be referred to, using the hash value. Therefore, as the blocks are accumulated, it is difficult to make an attempt at the forgery of the transaction data recorded in the block, and the reliability of the transaction data recorded in each block can be improved.

However, the blockchain techniques designed so far are difficult to be applied immediately to the financial field or company environment where strict control is required due to the following problems.

First, since the blockchain technique is a technique based on decentralization, there is a problem in which, if the entire system moves in a wrong direction, observation and correspondence thereto is not easy. In particular, since forgery of data is possible by nodes that secure computing capacity of a certain percentage or more as compared to the performance of the entire network, like 51% attack, the blockchain technique cannot be applied as it is to the financial field or the company environment where a high level of security is required.

Also, a branch occasionally occurs on the blockchain data, which may result in a case where transaction information recorded in the block cannot be checked. However, in the current blockchain technique has a problem that it is not easy to predict and respond to this situation. For example, as illustrated in FIG. 4, there may be a case where the first node, which has determined the first chain 20 as the longest main chain on the blockchain data to generate the block, may found a second chain 10 longer than the first chain 20 late in the process of synchronizing the blockchain. In such a case, the first node updates the blockchain data to the latest block "block #5", but in the updating process, the block position of the transaction data (e.g., transaction #1) recorded on the block #3' 21 of the first chain may be changed to another block 11.

That is, as the branch occurs, the block information referred to in order to check the transaction data changes, causing a problem that the transaction data cannot be checked during the predetermined time. However, since the technique of the blockchain designed so far cannot systematically predict whether the block position according to the occurrence of the branch occurs, there is a problem that it is difficult to cope with this situation.

Therefore, in order to apply the blockchain technique to the financial field or the company environment, a method for monitoring each distributed blockchain node is required, and a method for enabling prediction as to whether or not to change the block position of the transaction data according to the branch formed on the blockchain data is required.

SUMMARY

An aspect of the present disclosure provides a method for calculating the transaction confirmation reliability indicating the probability that the position of a block in which specific transaction data is recorded does not change, and an apparatus for executing the method.

Another aspect of the present disclosure provides a method capable of monitoring the branch state formed on blockchain data in order to calculate the transaction confirmation reliability, and an apparatus and a system for executing the method.

According to an embodiment of the present disclosure, there is provided a method comprising acquiring information on a branch formed on blockchain data, calculating a difference in a block height between a target block corresponding to a current block height of the blockchain data and a block in a non-branched state based on the information on the branch and calculating a transaction confirmation reliability of transaction data recorded in the target block based on the difference in the block height, wherein the transaction confirmation reliability indicates a probability that, for as k blocks are further connected after the target block, a position of the block at which the transaction data is recorded will not change, wherein k is an integer greater than zero.

According to another embodiment of the present disclosure, there is provided an apparatus for calculating transaction confirmation reliability comprising a hardware processor, a network interface, a memory configured to load a computer program executed by the hardware processor and a storage configured to store the computer program, wherein the computer program which, when executed by the hardware processor, causes the hardware processor to perform operations including acquiring information on a branch formed on blockchain data, calculating a difference in a block height between a target block corresponding to a current block height of the blockchain data and a block in a non-branched state based on the information on the branch and calculating a transaction confirmation reliability of transaction data recorded in the target block based on the difference in the block height, wherein the transaction confirmation reliability indicates a probability that, as k blocks are further connected after the target block, a block position at which the transaction data is recorded will not change, wherein k is an integer greater than zero.

According to still another embodiment of the present disclosure, a blockchain network monitoring system comprising a plurality of blockchain nodes which is a member of a blockchain network, distributes and manages blockchain data, generates a new block, and propagates the new block onto the blockchain network, a monitoring node which is a member of the blockchain network and monitors new blocks propagated onto the blockchain network in real time and a blockchain network monitoring apparatus which receives information on the new block from the monitoring node in real time, and monitors an occurrence state of a branch on the blockchain data, based on the information on the new block.

According to still another embodiment of the present disclosure, there is provided a non-transitory computer-readable storage medium storing a computer program which, when executed by a computing apparatus, causes the computing apparatus to perform acquiring information on a branch formed on blockchain data, calculating a difference in a block height between a target block corresponding to a current block height of the blockchain data and a block in a non-branched state based on the information on the branch and calculating a transaction confirmation reliability of transaction data recorded in the target block based on the difference in the block height, wherein the transaction confirmation reliability indicates a probability that, for as k blocks are further connected after the target block, a position of the block at which the transaction data is recorded will not change, wherein k is an integer greater than zero.

The aspects of the present disclosure are not limited to those mentioned above but another aspect which is not mentioned will be clearly understood from the description below to ordinary technicians in the technical field of the present disclosure.

According to the present disclosure described above, it is possible to calculate the transaction confirmation reliability indicating the probability that the block position in which specific transaction data is recorded does not change, on the basis of the Poisson distribution. As a result, it is possible to systematically predict and respond whether or not to change the recording location of specific transaction data.

In addition, the monitoring function for each blockchain node constituting the blockchain network can be provided, using a special node that executes only the monitoring function. This enables observation as to whether the blockchain-based system proceeds in the wrong direction, and also provides detailed monitoring functions required in the financial field and company fields.

In addition, one blockchain network can be configured between nodes located on heterogeneous networks via broker nodes, which are special nodes that provide data exchange functions between different networks. Accordingly, in many company environments, the same blockchain-based system can be constructed, and blockchain technique can be utilized in various fields.

The effects of the present disclosure are not limited to the effects mentioned above, and another effect which has not been mentioned can be clearly understood by ordinary technicians from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like numbers refer to like elements throughout.

Unless otherwise defined, all terms including technical and scientific terms used herein have the same meaning as commonly understood by one of ordinary skill in the art to which this disclosure belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Before describing the present specification, some terms used in this specification will be clarified.

Figure 1:
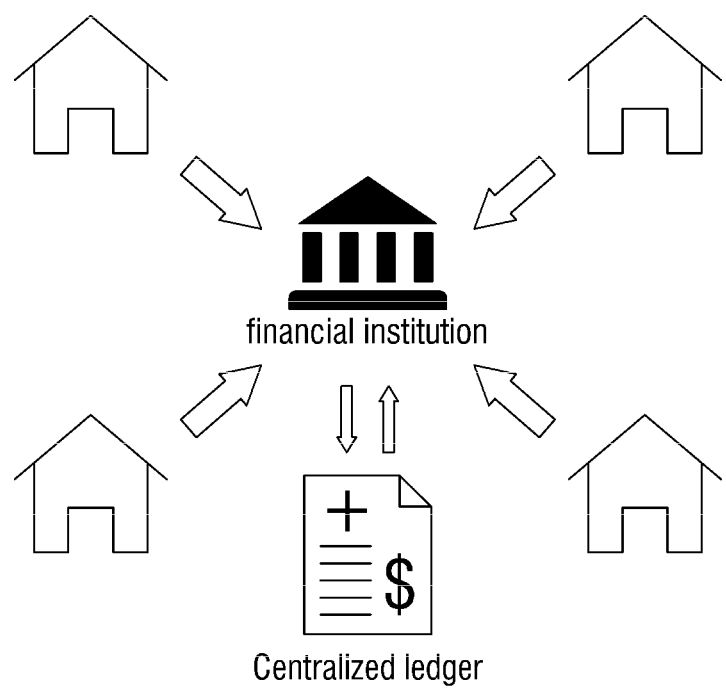
FIG. 1 is a conceptual diagram illustrating a conventional centralized ledger.
Figure 2:
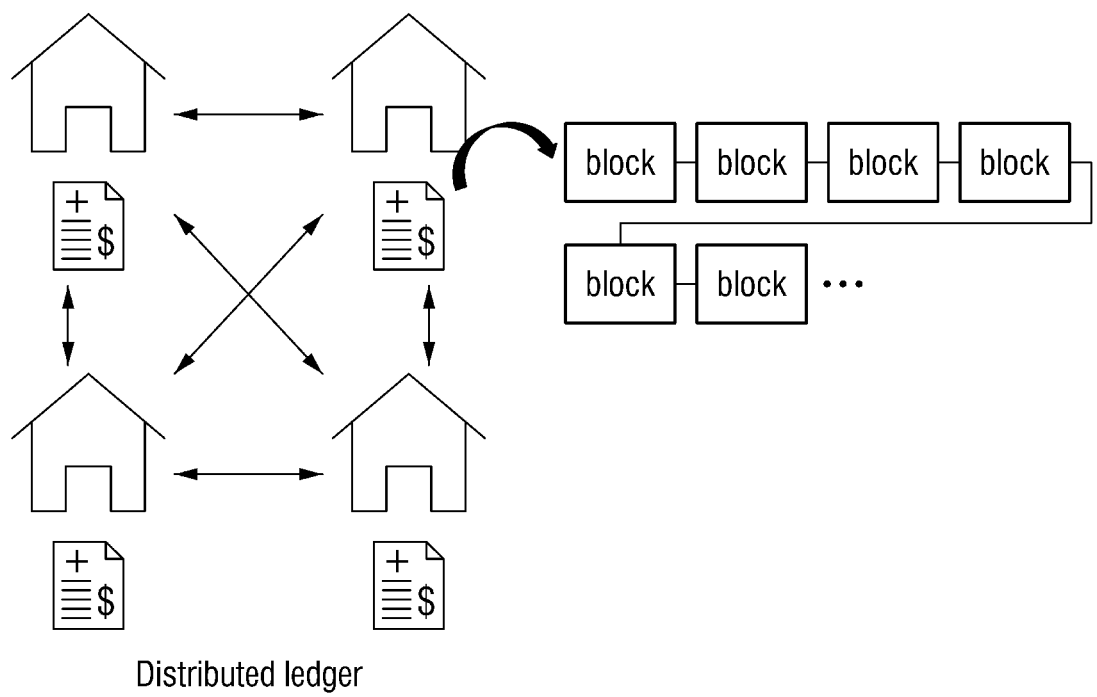
FIG. 2 is a conceptual diagram illustrating the blockchain-based distributed ledger.
Figure 3:
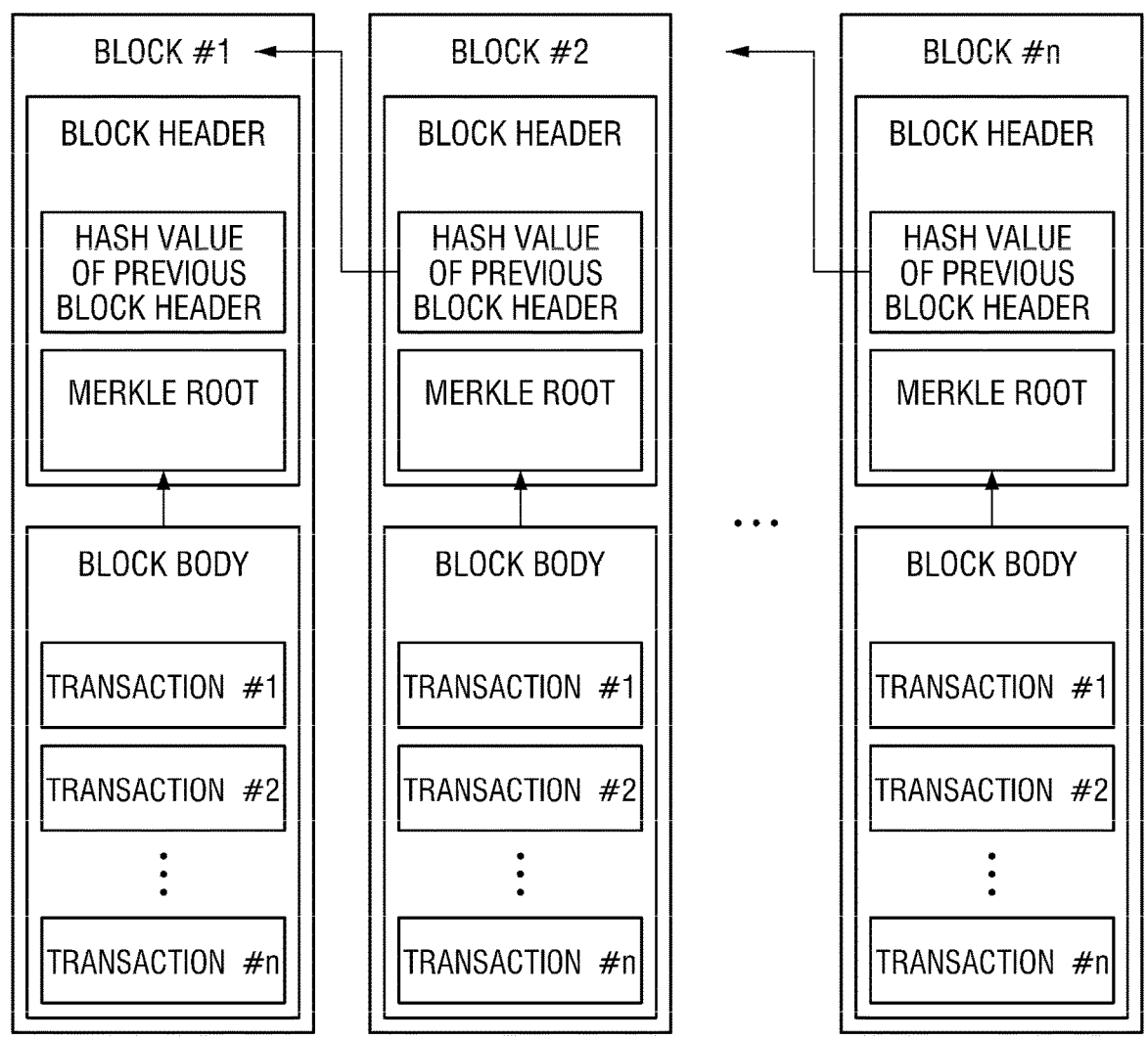
FIG. 3 is a diagram for explaining the structure of blockchain data maintained by each blockchain node constituting the blockchain network.
Figure 4:
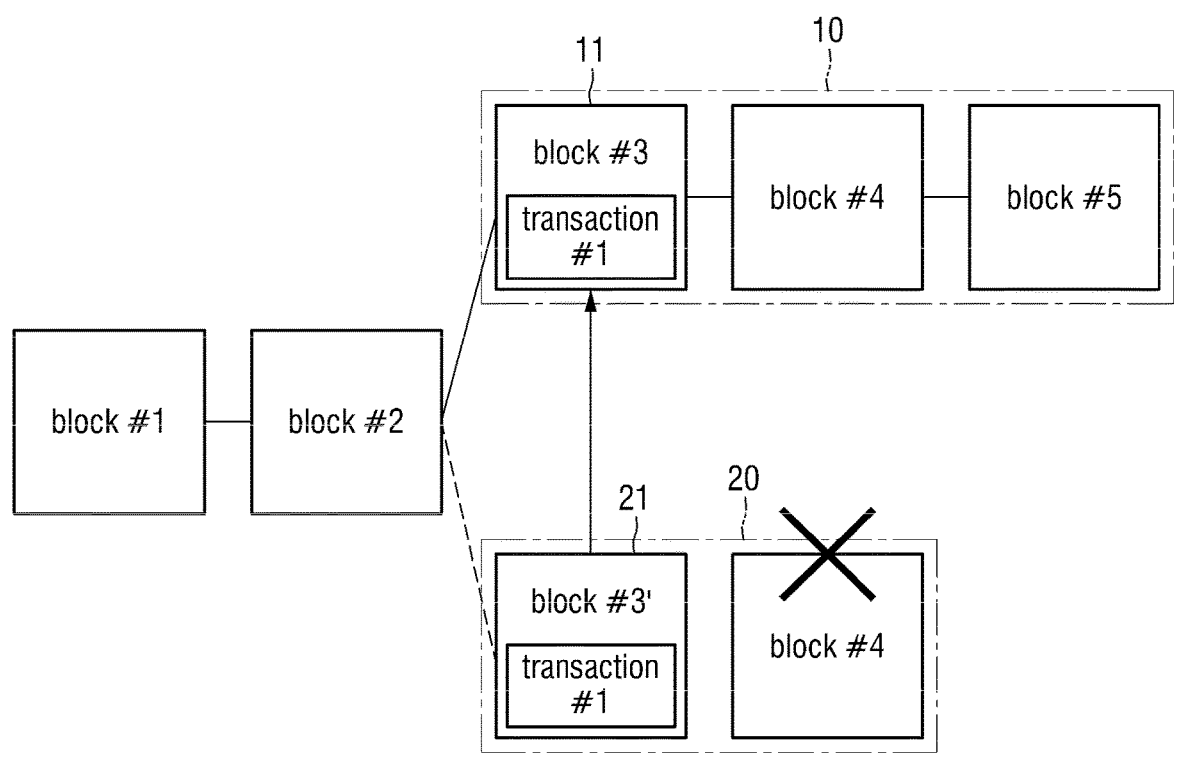
FIG. 4 is a diagram for explaining a problem in which the block position at which transaction data is recorded changes in accordance with formation of a branch in blockchain data.

In the present specification, blockchain data or blockchain itself is a data which is held by the respective blockchain nodes constituting the blockchain network, and means data in which at least one block forms a data structure in the form of a chain. When the data recorded in each block is transaction data, the blockchain data may be used as a distributed ledger. However, the data recorded in each block may be of any type. The structure of the above blockchain data will be described referring to FIG. 3.

In this specification, a blockchain network means a network of P2P structure constituted by plurality of blockchain nodes operated in accordance with a blockchain algorithm.

In this specification, a blockchain node means a subject which constitutes the blockchain network, and holds and manages blockchain data on the basis of a blockchain algorithm. The blockchain node may be provided as a single computing apparatus, but may also be provided as a virtual machine or the like. When provided as the virtual machine, a plurality of blockchain nodes may exist in a single computing apparatus.

In this specification, the block generation node means a node which generates a new block via mining of among the blockchain nodes constituting the blockchain network.

In the present specification, the transaction confirmation reliability means probability in which, as k (k is a natural number equal to or greater than 1) blocks are further connected after the target block corresponding to the height of the current block (or a sequence of k blocks occurs without branching after the target block), the block position of the transaction data recorded on the target block does not change. In other words, the transaction confirmation reliability may be understood to refer to the probability of being maintained as the main chain without forming a branch even if a new block is further added to the target block.

Hereinafter, some embodiments of the present disclosure will be described in detail with reference to the accompanying drawings.

First, a blockchain network monitoring system according to some embodiments of the present disclosure will be described with reference to FIGS. 5 and 6.

Figure 5:
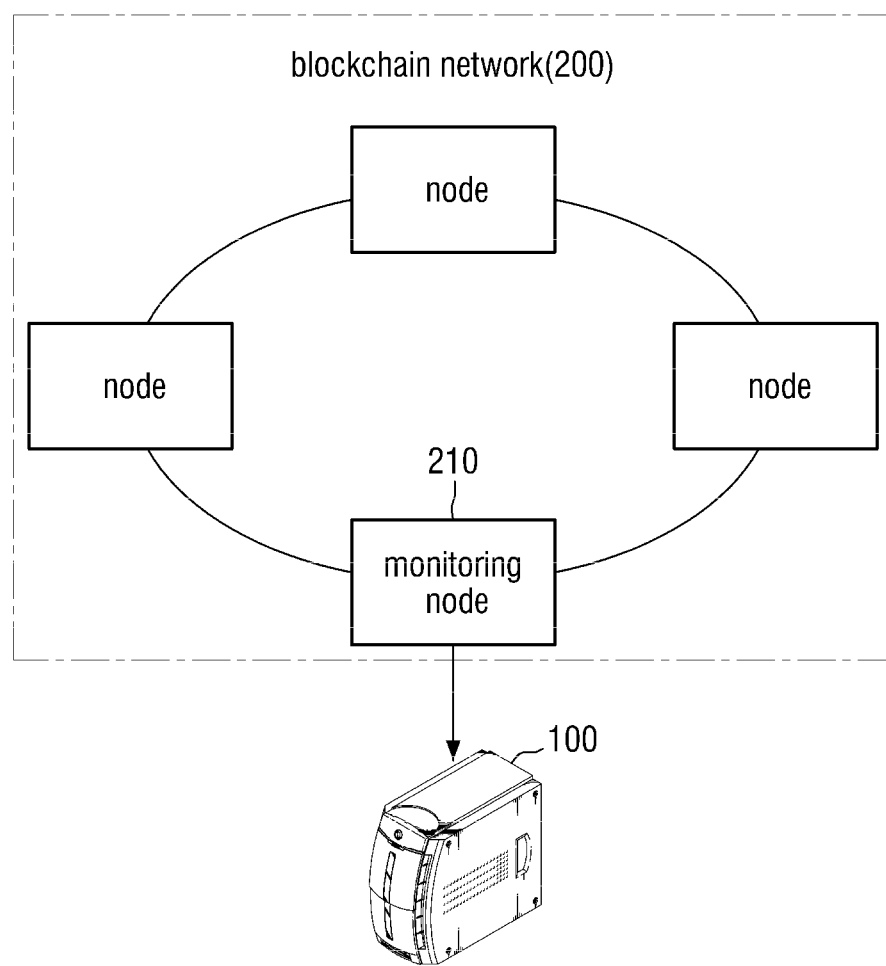
FIG. 5 is a configuration diagram of a blockchain network monitoring system according to the first embodiment of the present disclosure.

FIG. 5 is a configuration diagram of a blockchain network monitoring system according to the first embodiment of the present disclosure.

Referring to FIG. 5, the blockchain network monitoring system according to the first embodiment may be configured to include a blockchain network monitoring apparatus 100 and a blockchain network 200. However, this is only the preferred embodiment for achieving the object of the present disclosure, and some constituent elements may, of course, be added or deleted as necessary. In addition, each constituent element of the blockchain network monitoring system illustrated in FIG. 5 illustrates functional elements which are functionally separated. At least one constituent element may be provided in the form of being integrated with each other in an actual physical environment.

In the first embodiment, the blockchain network monitoring apparatus 100 is a computing apparatus that monitors various types of information such as the state and operation of a plurality of blockchain nodes constituting a blockchain network, and blockchain data. Here, the computing apparatus may be a notebook, a desktop, a laptop, or the like, but is not limited thereto, and may include all types of apparatuses including computing means and communication means.

For example, the blockchain network monitoring apparatus 100 may receive the state and operation of each blockchain node, and information on the blockchain data stored in each blockchain node, from the monitoring agent installed in each blockchain node. The monitoring agent may be understood as a software module for monitoring each blockchain node in the form of a daemon.

Also, the blockchain network monitoring apparatus 100 may receive transaction data and a new block propagated onto the network from the monitoring node 210 which is one of the nodes constituting the blockchain network 200 in real time. Here, the monitoring node 210 may be understood as a special type of blockchain node which intercepts various data propagated on the blockchain network 200 and delivers various data in real time.

The blockchain network monitoring apparatus 100 may provide various kinds of information collected as described above in a visualized form via various user interfaces.

According to the embodiment of the present disclosure, the blockchain network monitoring apparatus 100 receives chain structure information of blockchain data managed by the respective blockchain nodes from the monitoring agent in real time, and compares the chain structure information of the blockchain data for each blockchain node, and may monitor the occurrence branch state on the blockchain data in real time.

Or, the blockchain network monitoring apparatus 100 receives a new block propagated from the monitoring node 210 onto the blockchain network, compares whether the number of the new block matches the hash value, and may monitor the occurrence branch state on the blockchain data in real time.

According to the embodiment of the present disclosure, the blockchain network monitoring apparatus 100 may calculate the transaction confirmation reliability of the transaction data recorded on the target block, on the basis of the branch state formed on the blockchain data. Only in such an embodiment, the blockchain network monitoring apparatus 100 may be named a transaction confirmation reliability calculating apparatus 100. Here, the target block means the latest block corresponding to the height of the current block. In the following description, unless otherwise stated, the target block is used to refer to the latest block, and the concept of the block height refers to FIG. 10. According to the present embodiment, it is possible to systematically predict and respond whether to change the block position of specific transaction data originally recorded in the target block. The details of the method for calculating the transaction confirmation reliability by the transaction confirmation reliability calculating apparatus 100 will be described later with reference to FIGS. 9 to 13.

In the first embodiment, the blockchain network 200 is a network of P2P structure constituted by plurality of blockchain nodes. The blockchain nodes constituting the blockchain network 200 perform operations such as block generation, propagation, verification, and recording, on the basis of a blockchain algorithm. Further, each blockchain node holds the same blockchain data.

According to the embodiment of the present disclosure, the blockchain network 200 may be configured to include a monitoring node 210. As described above, the monitoring node 210 is a special type of node, and may collect transaction data and a new block to be propagated onto the blockchain network in real time and may deliver them to the blockchain network monitoring apparatus 100.

In the blockchain network monitoring system according to some embodiments of the present disclosure, each constituent element may communicate with each other via a network. Here, the network may be provided as all types of wired/wireless networks such as a local area network (LAN), a wide area network (WAN), a mobile radio communication network, and a wireless broadband Internet (Wibro).

The blockchain network monitoring system according to the first embodiment of the present disclosure has been described above. Next, a blockchain network monitoring system according to a second embodiment of the present disclosure will be described with reference to FIG. 6.

Figure 6:
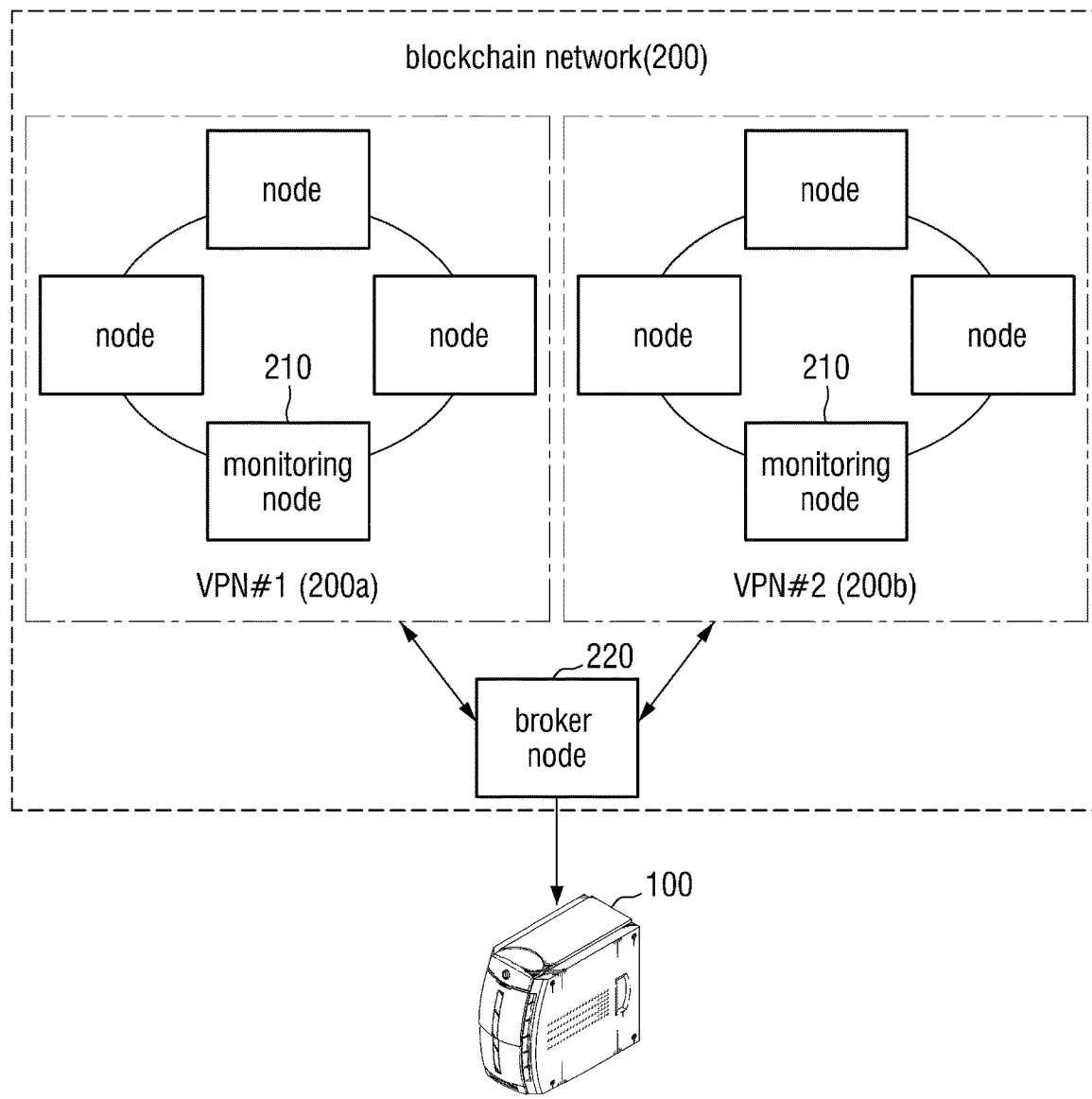
FIG. 6 is a configuration diagram of a blockchain network monitoring system according to a second embodiment of the present disclosure.

FIG. 6 is a configuration diagram of a blockchain network monitoring system according to a second embodiment of the present disclosure.

Referring to FIG. 6, in the second embodiment, a blockchain network 200 may be built on the basis of different network environments. Specifically, when a plurality of blockchain nodes includes a plurality of first blockchain nodes and a plurality of second blockchain nodes, the plurality of first blockchain nodes is located on the first network, the plurality of second blockchain node is located on the second network, and the first network and the second network may be configured in a heterogeneous network environment.

Specifically, the first network and the second network may be physically divided networks or logically divided networks. For example, the first network and the second network may be a network in which communication is performed using different communication protocols, a network constructed with different VPNs (virtual private networks), or the like. In FIG. 6, an example in which the first network and the second network are configured with different VPNs 200a, 200b has been illustrated.

In particular, in the financial field or the company environment in which security is important, the first blockchain node located on the intranet of the first company and the second blockchain node located on the intranet of the second company may not communicate with each other, even if the first and second blockchain nodes constitute the same blockchain network. In order to solve such a problem, the blockchain network monitoring system according to the second embodiment may be configured to further include a broker node 220.

The broker node 220 may execute the data exchange between the blockchain nodes located on the different networks 200a, 200b. For example, the broker node 220 may convert the data format to conform to the respective communication protocols. Alternatively, the broker node 200 may only perform the role of relaying data. Alternatively, the broker node 200 may perform data inspection, access control, or the like, on the basis of a predetermined security policy.

The blockchain network monitoring system according to the second embodiment of the present disclosure has been described above with reference to FIG. 6. Next, the configuration and operation of the transaction confirmation reliability calculating apparatus 100 according to another embodiment of the present disclosure will be described referring to FIGS. 7 and 8.

Figure 7:
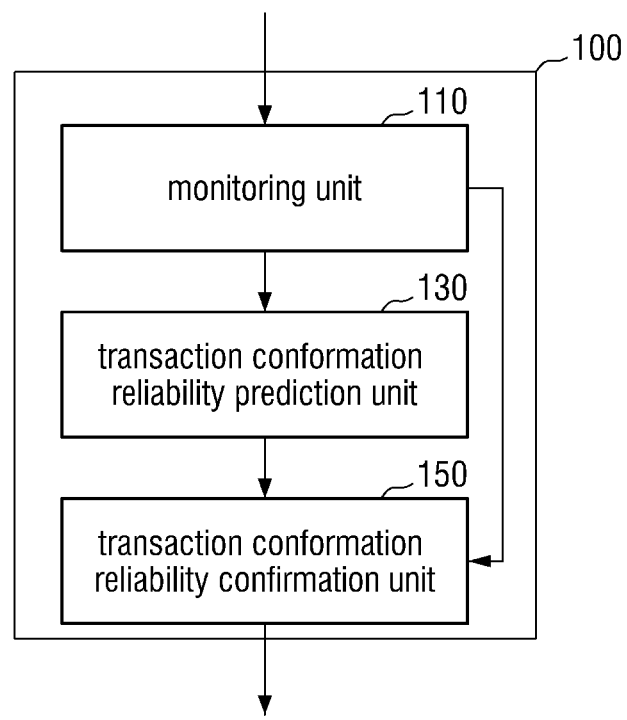
FIG. 7 is a block diagram illustrating a transaction confirmation reliability calculating apparatus according to another embodiment of the present disclosure.

FIG. 7 is a block diagram illustrating the transaction confirmation reliability calculating apparatus 100 according to an embodiment of the present disclosure.

Referring to FIG. 7, the transaction confirmation reliability calculating apparatus 100 may be configured to include a monitoring unit 110, a transaction confirmation reliability prediction unit 130, and a transaction confirmation reliability confirmation unit 150. However, only the constituent elements associated with the embodiment of the present disclosure are illustrated in FIG. 7. Therefore, one of ordinary skill in the art to which the present disclosure belongs may understand that other general-purpose constituent elements may be further included, in addition to the constituent elements illustrated in FIG. 7. In addition, the respective constituent elements of the transaction confirmation reliability calculating apparatus illustrated in FIG. 7 indicate functional elements that are functionally distinguished, and it is noted that at least one constituent element may be provided in the form of being integrated with each other is an actual physical environment.

Looking at each constituent element, the monitoring unit 110 acquires in real time the monitoring information of the blockchain data of each blockchain node constituting the blockchain network. At this time, the monitoring information may include information on the branch formed on the blockchain data.

The transaction confirmation reliability prediction unit 130 predicts the transaction confirmation reliability of the transaction data recorded on the target block on the basis of the information on the branch of the first timing provided by the monitoring unit 110. A detailed description of the operation of the transaction confirmation reliability prediction unit 130 will be provided later with reference to FIGS. 9, 11, and 12.

The transaction confirmation reliability confirmation unit 150 adjusts or confirms the transaction confirmation reliability predicted by the transaction confirmation reliability prediction unit 130 on the basis of information on the branch at the second timing provided by the monitoring unit 110. That is, the transaction confirmation reliability confirmation unit 150 compares the predicted value whether a branch occurs with the actual observation information at the second timing, on the basis of information on the branch at the first timing, thereby adjusting or confirming the predicted transaction confirmation reliability. A detailed explanation of the operation of the transaction confirmation reliability confirmation unit 150 will be described later with reference to FIG. 13.

The respective constituent elements of the transaction confirmation reliability calculating apparatus 100 illustrated in FIG. 7 may mean software or hardware such as Software, FPGA (Field Programmable Gate Array) and ASIC (Application-Specific Integrated Circuit). However, the above-described constituent elements are not limited to software or hardware, but may be configured to be located in a storage medium capable of addressing, and may be configured to execute one or more processors. The functions provided in the above-mentioned constituent elements may be achieved by more segmented constituent elements, and may be achieved by one constituent element which performs a specific function by combining a plurality of constituent elements.

Figure 8:
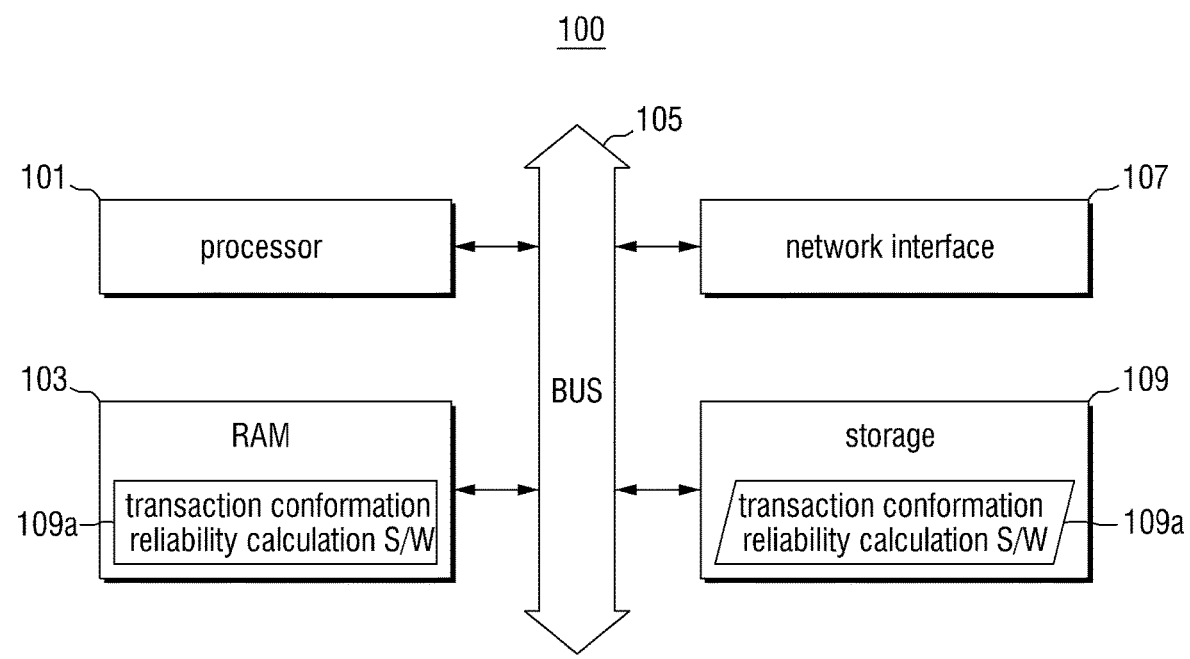
FIG. 8 is a hardware configuration diagram of a transaction confirmation reliability calculating apparatus according to still another embodiment of the present disclosure.

FIG. 8 is a hardware configuration diagram of a transaction confirmation reliability calculating apparatus 100 according to an embodiment of the present disclosure.

Referring to FIG. 8, the transaction confirmation reliability calculating apparatus 100 may include one or more processors 101, a bus 105, a network interface 107, a memory 103 for loading a computer program executed by the processor 101, and a storage 109 for storing the transaction confirmation reliability calculation software 109a. However, only the constituent elements associated with the embodiment of the present disclosure are illustrated in FIG. 8. Therefore, one of ordinary skill in the art to which the present disclosure belongs may understand that other general-purpose constituent elements may be further included, in addition to the constituent elements illustrated in FIG. 8.

The processor 101 controls the overall operation of each configuration of the transaction confirmation reliability calculating apparatus 100. The processor 101 may be configured to include a CPU (Central Processing Unit), a MPU (Micro Processor Unit), a MCU (Micro Controller Unit), a GPU (Graphic Processing Unit), or any type of processor well known in the technical field of the present disclosure. In addition, the processor 101 may execute the operation of at least one application or program for executing the method according to the embodiment of the present disclosure. The transaction confirmation reliability calculating apparatus 100 may include one or more processors.

The memory 103 stores various types of data, commands, and/or information. The memory 103 may load one or more programs 109a from the storage 109 in order to execute the transaction confirmation reliability calculating method according to the embodiments of the present disclosure. In FIG. 8, a RAM is illustrated as an example of the memory 103.

The bus 105 provides a communication function between the constituent elements of the transaction confirmation reliability calculating apparatus 100. The bus 105 may be provided as various forms of bus such as an address bus, a data bus and a control bus.

The network interface 107 supports wired/wireless Internet communication of the transaction confirmation reliability calculating apparatus 100. Also, the network interface 107 may support various communication methods other than the Internet communication. To this end, the network interface 107 may be configured to include a communication module that is well-known in the technical field of the present disclosure.

The storage 109 may non-temporarily store one or more programs 109a. In FIG. 8, the transaction confirmation reliability calculation software 109a is illustrated as the example of one or more programs 109a.

The storage 109 may be configured to include a nonvolatile memory such as a ROM (Read Only Memory), an EPROM (Erasable Programmable ROM), an EEPROM (Electrically Erasable Programmable ROM), and flash memory, a hard disk, a removable disk, or a computer-readable recording medium of any form well-known in the technique field to which the present disclosure pertains.

The transaction confirmation reliability calculation software 109a may execute a transaction confirmation reliability calculating method to be described later. Specifically, the transaction confirmation reliability calculation software 109a is loaded to the memory 103, and may execute, by one or more processors 101, an operation which acquires information on a branch formed on the blockchain data, an operation which calculates a difference in the block heights between the target block corresponding to the current block height of the blockchain data and the block of an non-branched state which is not in the branch state, on the basis of information on the branch, and an operation which calculates the transaction confirmation reliability of the transaction data recorded in the target block on the basis of the block height difference.

The configuration and operation of the transaction confirmation reliability calculating apparatus 100 according to the embodiment of the present disclosure have been described with reference to FIGS. 7 and 8. Next, a transaction confirmation reliability calculating method according to another embodiment of the present disclosure will be described in detail with reference to FIGS. 9 to 13.

Each step of the transaction confirmation reliability calculating method according to the embodiment of the present disclosure to be described later may be executed by a computing apparatus. For example, the above-described computing apparatus may be the transaction confirmation reliability calculating apparatus 100. However, for the sake of convenience of explanation, the description of the operation subject of each step included in the transaction confirmation reliability calculating method may be omitted. Further, each step of the transaction confirmation reliability calculating method may be an operation executed in the transaction confirmation reliability calculating apparatus 100 as the transaction confirmation reliability calculation software 109a is executed by the processor 101.

Figure 9:
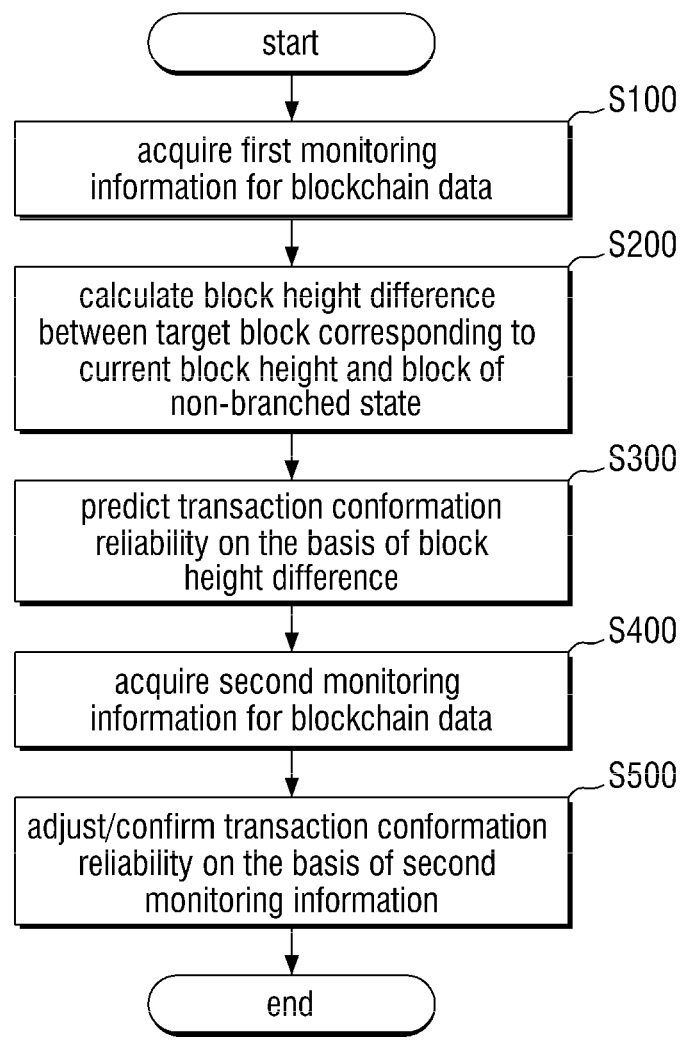
FIG. 9 is a flowchart of a transaction confirmation reliability calculating method according to still another embodiment of the present disclosure.
Figure 10:
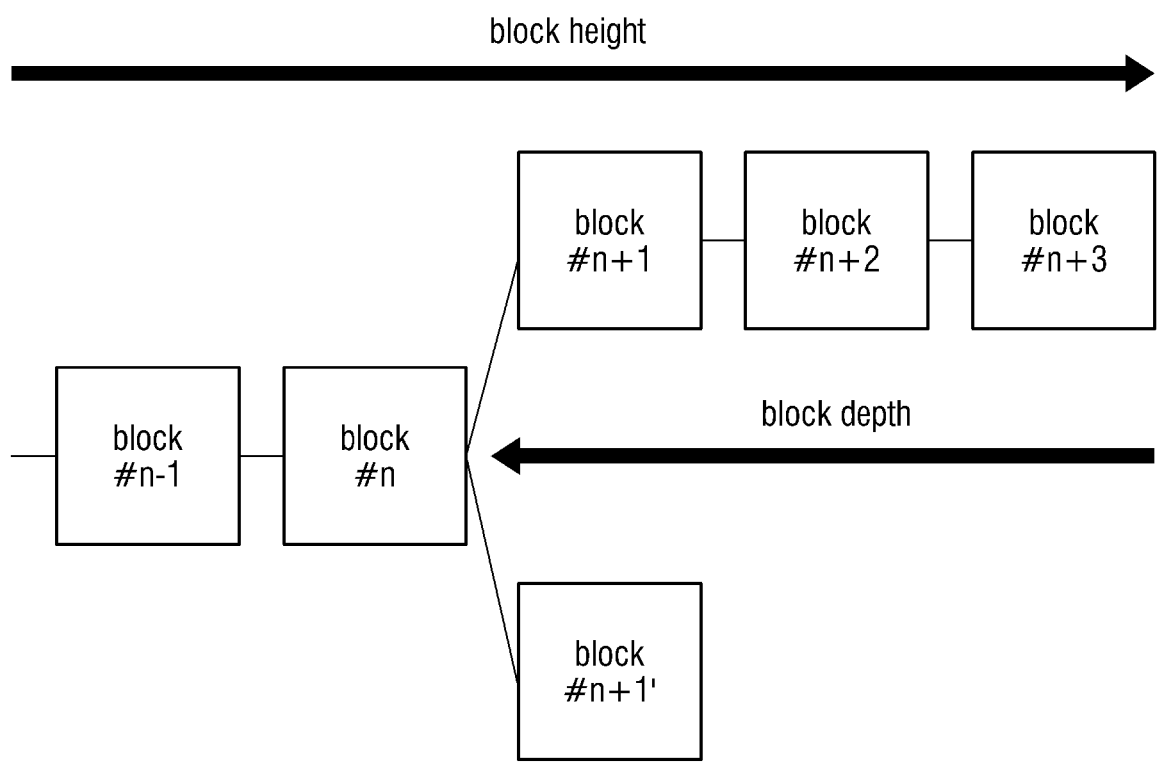
FIG. 10 is a diagram for comparatively explaining the concept of block height and block depth which can be referred to in some embodiments of the present disclosure.

FIG. 9 is a flowchart of the transaction confirmation reliability calculating method. However, this is only a preferred embodiment for achieving the objects of the present disclosure, and some steps may, of course, be added or deleted as necessary.

First, the transaction confirmation reliability calculating apparatus 100 acquires the first monitoring information of the blockchain data (S100). Here, the first monitoring information includes information on the branch formed on the blockchain data. In more detail, the information on the branch may include a hash value of each block on the blockchain data and a block height of each block. Or, the information on the branch may include processed/generated information (e.g. branch state shown as FIG. 11) based on the hash value of each block and the block height of each block. The method for obtaining information on the branch may be any type. For example, the transaction confirmation reliability calculating apparatus 100 receives the chain structure information of blockchain data from a monitoring agent installed on each blockchain node on the blockchain network, and checks whether the chain structure information of the blockchain data match, and may acquire information on the branch. Alternatively, it is also possible to collect new blocks propagated from the monitoring node onto the blockchain network in real time and compare the number of the new block with the hash value to acquire information on the branch.

Next, the transaction confirmation reliability calculating apparatus 100 calculates the difference in block height between the target block and the block of the non-branched state on the basis of information on the branch (S200). Here, the block height difference may be understood as meaning the distance from the target block to the preceding block (that is, the block of non-branched state) located on a point at which a branch is no longer generated. The concept of the block height is referred to as FIG. 10, and since it is a concept obvious to ordinary technicians in the technical field, the explanation thereof will not be provided.

Figure 11:
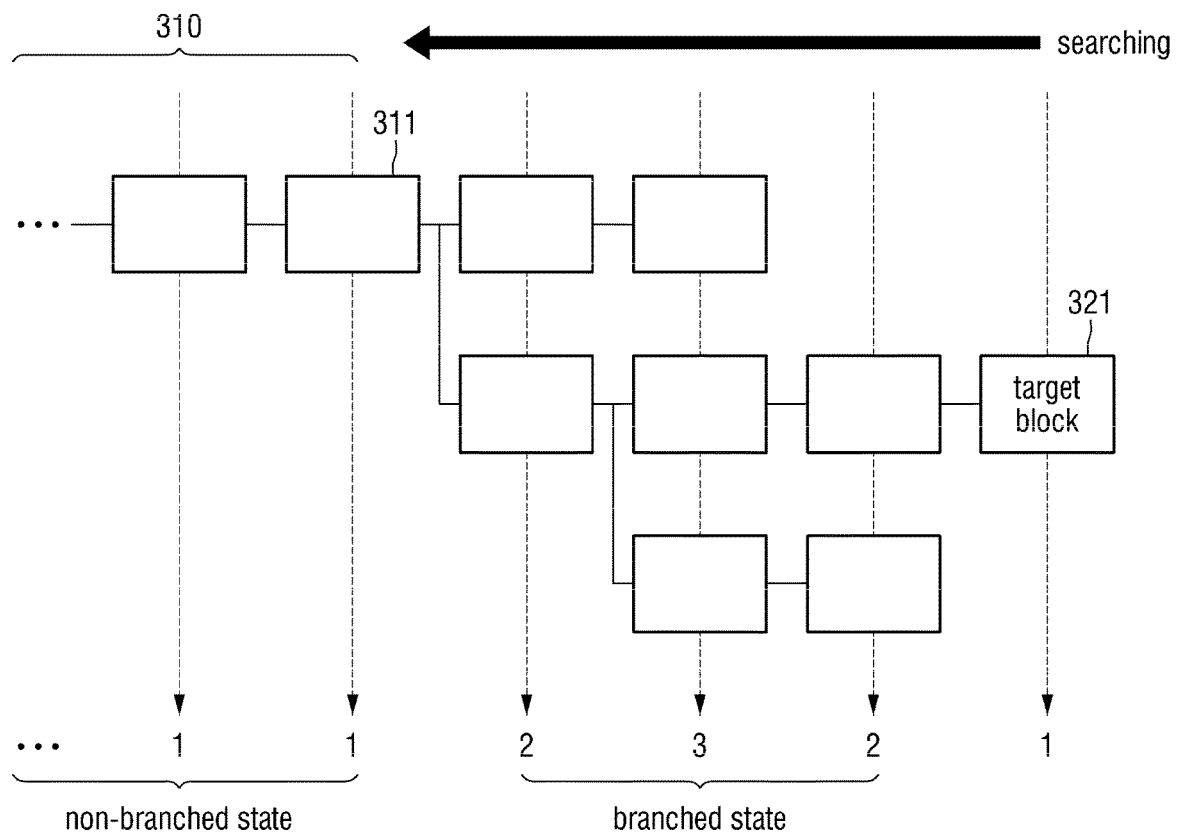
FIG. 11 and FIG. 12 are diagrams for explaining a transaction confirmation reliability predicting step (S300) illustrated in FIG. 9.

The block of the non-branched state means a block which is not in the branched state, and as illustrated in FIG. 11, the block in the branched state may be understood as a block in the branched state, when there is a plurality of blocks having the same block height or number. In FIG. 11, the block through which each dotted line passes means the block having the same block height or number.

Referring to FIG. 11, step S200 will be explained extensively.

In order to calculate the difference in block height between the target block and the block of the non-branched state, the position of the block of the non-branched state needs to be first determined. To this end, the transaction confirmation reliability calculating apparatus 100 executes the searching in the direction of the preceding block with reference to the target block 321, and determines whether each block is in a branched state or in a non-branched state. The above determination may be executed in a manner of comparing hash values of blocks having the same block height or number. Specifically, when the number of blocks having different hash values exceeds 1, the block corresponding to the block height may be determined to be in the branched state. As a specific example, since the number of blocks having different hash values is "2", immediately previous block of the target block 321 may be determined to be in the branched state. Further, since the number of blocks having different hash values is "1", the block 311 may be determined to be in the non-branched state. Here, as the hash value, for example, an arbitrary hash value such as a hash value of a preceding block included in each block or a hash value recorded in a merkle root field may be used.

The transaction confirmation reliability calculating apparatus 100 executes searching until a block section 310 is found in which the number of blocks having different hash values among the blocks of the same height is continuously "1" over a predetermined number of times or more. Further, the transaction confirmation reliability calculating apparatus 100 calculates the difference in block height between the first searched block (or the block having highest block height among blocks of the block section 310) 311 of the non-branched state and the target block among the blocks included in the block section 310.

In other words, the transaction confirmation reliability calculating apparatus 100 may find block 311 by counting a number of blocks having different hash values for each block height and identifying a sequence of blocks as a block section 310 in which the number of is continuously "1" among preceding blocks of the target block 321 and determining a block have highest block height among at least one blocks of the block section 311.

Referring again to FIG. 9, the transaction confirmation reliability calculating apparatus 100 predicts the transaction confirmation reliability (S300), on the basis of the difference in the block heights calculated in step S200.

According to an embodiment of the present disclosure, the transaction confirmation reliability described above may be predicted on the basis of a Poisson distribution. The generation of a new block executed by the generation node of each block on the blockchain network is mutually independent cases and follows the Poisson distribution. For the same reason, the difference in block height to the block of the non-branched state in which the branch no longer occurs on the basis of the target block also follows the Poisson distribution.

Therefore, the transaction confirmation reliability calculating apparatus 100 may predict the transaction confirmation reliability according to addition of the new block after the target block, using formula 1 expressing the Poisson distribution and formula 2 expressing the cumulative Poisson distribution. Specifically, when the k new blocks are further added, the transaction confirmation reliability of the transaction data recorded in the target block is the cumulative value of the first transaction confirmation probability according to the addition of one new block and a k-th transaction confirmation probability according to the addition of new k blocks. Thus, the transaction confirmation reliability is calculated on the basis of the cumulative Poisson distribution according to formula 2 below. Further, each transaction confirmation probability is calculated on the basis of the following formula 1.

In the following formulas 1 and 2, $\lambda$ denotes the parameter of the Poisson distribution, and n denotes the number of blocks to be added after the target block.

$$f(n; \lambda) = \frac{e^{-\lambda} \cdot \lambda^n}{n!} \quad \text{[Formula 1: Poisson Distribution]}$$

$$e^{-\lambda} \sum_{i=0}^{\lfloor n \rfloor} \frac{\lambda^i}{i!} = \frac{\Gamma(\lfloor n+1 \rfloor, \lambda)}{\lfloor n \rfloor !} \quad \text{[Formula 2: Cumulative Poisson Distribution]}$$

In order to predict the transaction confirmation reliability using formulas 1 and 2 above, the parameters of the Poisson distribution needs to be determined in advance.

In an embodiment, the transaction confirmation reliability calculating apparatus 100 may calculate the transaction confirmation reliability, using the block height difference calculated in step S200 as the parameter.

Figure 12:
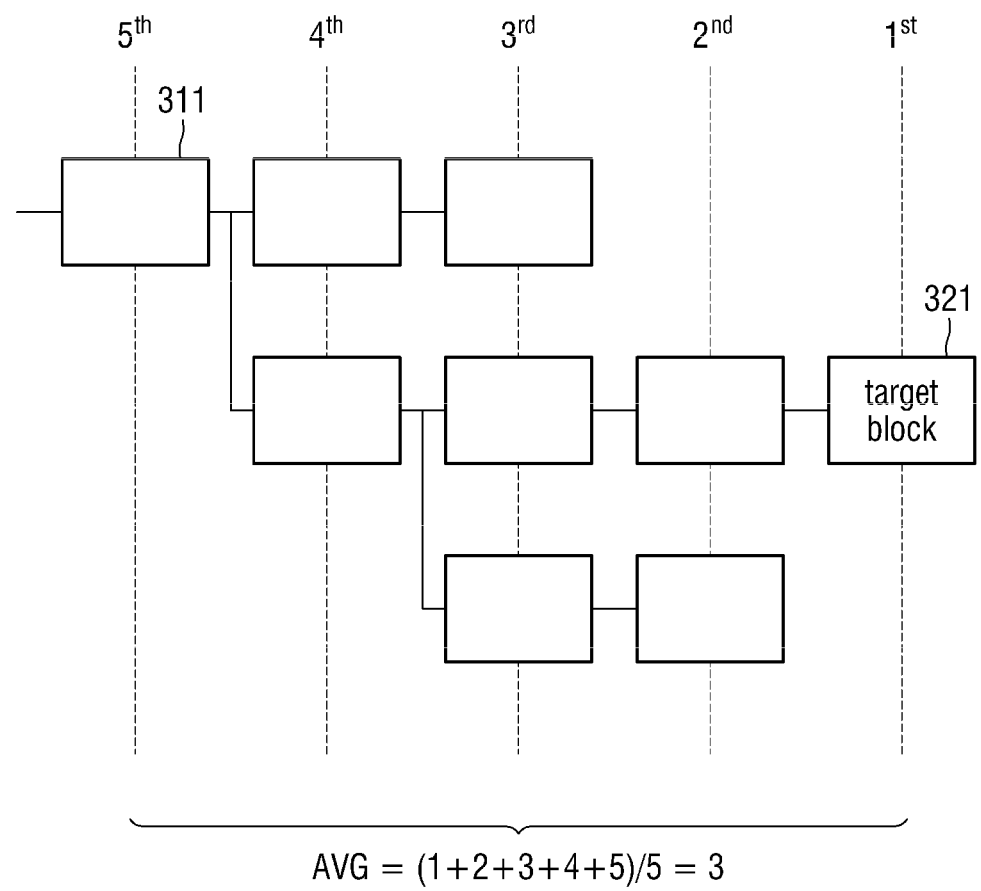

In another embodiment, as illustrated in FIG. 12, the transaction confirmation reliability calculating apparatus 100 may predict the transaction confirmation reliability, using the average of the block sequence numbers as the parameter. Here, the block sequence number means a block number given in the direction of the preceding block on the basis of the target block.

Referring to FIG. 12, specifically, the transaction confirmation reliability calculating apparatus 100 may assign the block sequence number to each of the blocks included in the block section from the target block 321 to the non-branched state 311, on the basis of the block height difference calculated in step S200. The above block sequence number is displayed at the upper end of FIG. 12. Next, the transaction confirmation reliability calculating apparatus 100 calculates the average of the sequence numbers of the blocks assigned to each of the blocks, and may use the calculated average value as the parameter of the Poisson distribution. In the case of FIG. 12, it is possible to check that the average (AVG) of the block sequence numbers is calculated as "3".

Referring again to FIG. 9, the transaction confirmation reliability calculating apparatus 100 acquires the second monitoring information of the blockchain data, and adjusts or confirms the transaction confirmation reliability on the basis of the second monitoring information, (S400, S500). At this time, the second monitoring information includes information on a branch formed on the blockchain data after the time when the first monitoring information is acquired.

That is, in step S500, the transaction confirmation reliability calculating apparatus 100 adjusts or confirms the transaction confirmation reliability value predicted in step S300 on the basis of the actual observation information included in the second monitoring information in step S500. The step S500 will be explained more with reference to FIG. 13 below.

Figure 13:
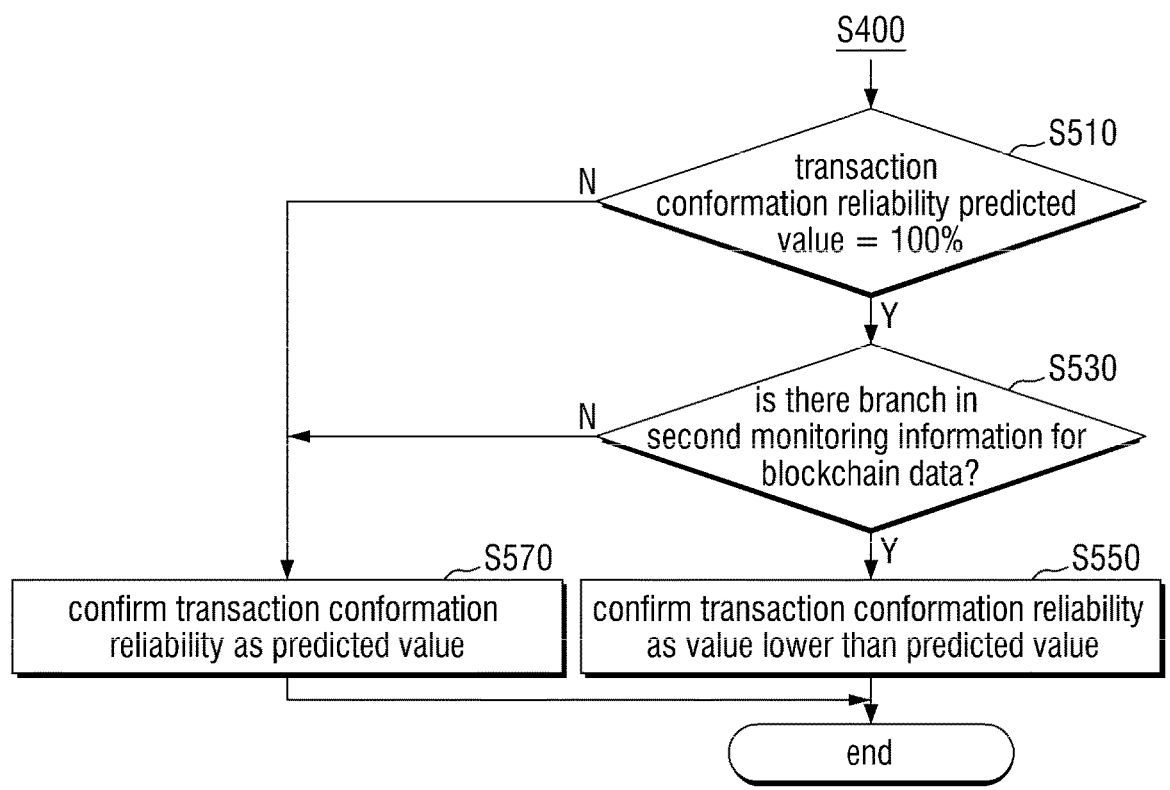
FIG. 13 is a detailed flowchart of a transaction confirmation reliability determination step (S500) illustrated in FIG. 9.

FIG. 13 is a detailed flowchart of the transaction confirmation reliability adjustment step (S500).

Referring to FIG. 13, when the predicted value of the transaction confirmation reliability is not "100%", the transaction confirmation reliability calculating apparatus 100 confirms the transaction confirmation reliability in the state of the predicted value, regardless of presence or absence of the branch (S510, S570).

In contrast, when the predicted value of the transaction confirmation reliability is "100%", the transaction confirmation reliability calculating apparatus 100 checks whether a branch occurs on the blockchain data from the second monitoring information, and adjusts and confirms the transaction confirmation reliability to a value lower than the original predicted value when a branch occurs (S530, S550). More specifically, when k new blocks are added, if the predicted value of the transaction confirmation reliability is "100%", when a branch occurs while k new blocks are added from the second monitoring information, the predicted value of the transaction confirmation reliability is adjusted to a lower value. That is, the operation of steps (S530, S550) may be understood as the operation for appropriately adjusting or evaluating the transaction confirmation reliability when a branch as the actual observation result occurs, a situation in which it is predicted that a branch does not occur probabilistically (that is, the transaction confirmation reliability is "100%").

When the predicted value of the transaction confirmation reliability is "100%" and the branch does not occurred as predicted, since the predicted value is accurate, the transaction confirmation reliability calculating apparatus 100 confirms the transaction confirmation reliability as in the predicted value (S530, S570).

On the other hand, according to the embodiment of the present disclosure, the transaction confirmation reliability calculating apparatus 100 may provide information on how many new block needs to be added so that the transaction confirmation reliability becomes a reference value or higher conversely, for the transaction data recorded in the target block. For example, when the k blocks are connected while changing the value of the number k of new blocks, the transaction confirmation reliability calculating apparatus 100 predicts the transaction confirmation reliability for each block, and determines the value of k at which the predicted transaction confirmation reliability is the reference value or more, thereby providing the value of k which is the number of new blocks to be added.

The transaction confirmation reliability calculating method according to another embodiment of the present disclosure has been described above with reference to FIGS. 9 to 13. According to the above method, it is possible to calculate the transaction confirmation reliability indicating the probability that the block position at which specific transaction data is recorded does not change, on the basis of the Poisson distribution. As a result, it is possible to systematically predict and respond whether the recording location of specific transaction data changes. For example, if the transaction confirmation reliability is equal to or less than the threshold value, by storing the transaction data in a separate storage location until the transaction confirmation reliability becomes equal to or larger than the threshold value, and by inquiring the transaction data in the separate storage location, it is possible to prevent situations in which it is not possible to check the transaction information in accordance with the change of the block position.

The concepts of the disclosure described above with reference to FIGS. 5 to 13 can be embodied as computer-readable code on a computer-readable medium. The computer-readable medium may be, for example, a removable recording medium (a CD, a DVD, a Blu-ray disc, a USB storage apparatus, or a removable hard disc) or a fixed recording medium (a ROM, a RAM, or a computer-embedded hard disc). The computer program recorded on the computer-readable recording medium may be transmitted to another computing apparatus via a network such as the Internet and installed in the computing apparatus. Hence, the computer program can be used in the computing apparatus.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

What is claimed is:

1. A method performed by a blockchain network monitoring apparatus for monitoring a block chain network including a plurality of nodes, the method comprising:
  acquiring information on a branch formed on blockchain data from a node included in the blockchain network;
  calculating a difference in a block height between a target block corresponding to a current block height of the blockchain data and a block in a non-branched state based on the information on the branch or based on identifying a sequence of blocks in the blockchain data; and
  calculating a transaction confirmation reliability of transaction data recorded in the target block based on the difference in the block height,
  wherein the transaction confirmation reliability indicates a probability that, for as k blocks are further connected after the target block, a position of the block at which the transaction data is recorded will not change,
  wherein k is an integer greater than zero, and
  wherein the calculating the transaction confirmation reliability comprises predicting the transaction confirmation reliability, using a Poisson distribution based on the difference in the block height and the predicting the transaction confirmation reliability using the Poisson distribution comprises:
    assigning a block sequence number to each of the blocks included in a block section from the target block to the block of the non-branched state, based on the difference in the block height;
    calculating an average of the block sequence numbers assigned to each of the blocks; and predicting the transaction confirmation reliability wherein a parameter λ of the Poisson distribution is set to an average of the block sequence number.

2. The method of claim 1, wherein the identifying the sequence of blocks comprises identifying the sequence of blocks as a block section for which there are no two blocks with the same block number but different hash values, wherein two blocks with the same block number and different hash values would indicate presence of a branch at or before that block number, in a direction preceding the target block.

3. The method of claim 1, wherein the blockchain data is first blockchain data,
the method further comprising:
acquiring second information on a branch formed on second blockchain data, wherein the second blockchain data includes the first blockchain data and k blocks further connected to the first blockchain data; and
evaluating the calculated transaction confirmation reliability based on the second information.

4. The method of claim 3, wherein evaluating the calculated transaction confirmation reliability comprises adjusting the calculated transaction confirmation reliability to a value lower than a current calculated value, in response to determining that the calculated transaction confirmation reliability indicates probabilistically that a branch does not occur and the branch is formed on the second blockchain data after the target block.

5. The method of claim 3, wherein the evaluating the calculated transaction confirmation reliability comprises confirming the calculated transaction confirmation reliability as a current calculated value, in response to determining that the calculated transaction confirmation reliability indicates probabilistically that a branch does not occur and no branch is formed on the second blockchain data after the target block.

6. The method of claim 3, wherein the evaluating the calculated transaction confirmation reliability comprises confirming the calculated transaction confirmation reliability as a current calculated value in response to determining that the calculated transaction confirmation reliability is less than 100%.

7. The method of claim 1, wherein calculating the transaction confirmation reliability comprises:
calculating the transaction confirmation reliability for each case where k blocks are connected; and
determining a value of k at which the transaction confirmation reliability becomes a specified value or more.

8. The method of claim 1, further comprising:
receiving in real time a first new block and a second new block propagated onto the target block;
comparing whether a hash value of the first new block and a hash value of the second new block is matched, the first new block and the second new block having a same block number; and
generating the information on the branch based on a result of the comparing.

9. A blockchain network monitoring system comprising:
a plurality of blockchain nodes which is a member of a blockchain network, distributes and manages blockchain data, generates a new block, and propagates the new block onto the blockchain network;
a monitoring node which is a member of the blockchain network and monitors new blocks propagated onto the blockchain network in real time;
a blockchain network monitoring apparatus which receives information on the new block from the monitoring node in real time, and monitors an occurrence state of a branch on the blockchain data, based on the information on the new block,
wherein the blockchain network monitoring apparatus is configured to:
calculate a transaction confirmation reliability by predicting the transaction confirmation reliability using a Poisson distribution based on a difference in a block height, wherein the predicting the transaction confirmation reliability using the Poisson distribution:
assigns a block sequence number to each of the blocks included in a block section from the target block to the block of the non-branched state, based on the difference in the block height;
calculates an average of the block sequence numbers assigned to each of the blocks; and
predict the transaction confirmation reliability wherein a parameter λ of the Poisson distribution is set to an average of the block sequence number.

10. The blockchain network monitoring system of claim 9, wherein the first plurality of blockchain nodes is located on a first network, and the second plurality of blockchain node is located on a second network, and
the first network and the second network are configured in different network environments.

11. An apparatus for monitoring a block chain network including a plurality of nodes and calculating transaction confirmation reliability comprising:
a hardware processor;
a network interface;
a memory configured to load a computer program executed by the hardware processor; and
a storage configured to store the computer program,
wherein the computer program which, when executed by the hardware processor, causes the hardware processor to perform operations including:
acquiring information on a branch formed on blockchain data from a node included in the blockchain network;
calculating a difference in a block height between a target block corresponding to a current block height of the blockchain data and a block in a non-branched state based on the information on the branch or based on identifying a sequence of blocks in the blockchain data; and
calculating a transaction confirmation reliability of transaction data recorded in the target block based on the difference in the block height,
wherein the transaction confirmation reliability indicates a probability that, as k blocks are further connected after the target block, a block position at which the transaction data is recorded will not change, wherein k is an integer greater than zero,
wherein the computer program is further configured to cause the hardware processor to perform operations including calculating a transaction confirmation reliability by predicting the transaction confirmation reliability using a Poisson distribution based on a difference in a block height, wherein the predicting the transaction confirmation reliability using the Poisson distribution:
assigns a block sequence number to each of the blocks included in a block section from the target block to the block of the non-branched state, based on the difference in the block height;

assigns an average of the block sequence numbers assigned to each of the blocks; and predicts the transaction confirmation reliability wherein a parameter λ of the Poisson distribution is set to an average of the block sequence number.

12. The apparatus for calculating transaction confirmation reliability of claim 11, wherein the identifying a sequence of blocks includes identifying the sequence of blocks as a block section for which there are no two blocks with the same block number but difference hash values, wherein two blocks with the same number and different hash values would indicate a presence of a branch at or before that block number, in a direction preceding the target block.

13. The apparatus for calculating transaction confirmation reliability of claim 11, wherein the blockchain data is first blockchain data, and the operations of the computer program further includes:
acquiring second information on a second branch formed on second blockchain data, the second blockchain data including the first blockchain data; and
evaluating the calculated transaction confirmation reliability based on information on a branch formed on the second blockchain data.

14. The apparatus for calculating transaction confirmation reliability of claim 13, wherein evaluating the calculated transaction confirmation reliability includes evaluating the calculated transaction confirmation reliability as a current calculated value, in response to determining that the calculated transaction confirmation reliability is less than 100%.

* * * * *